United States Patent
Mayes et al.

(10) Patent No.: US 9,942,998 B1
(45) Date of Patent: Apr. 10, 2018

(54) ELECTRONIC MOBILE DEVICE HOLDER

(71) Applicant: Flight Level Design Partners, LLC, Reno, NV (US)

(72) Inventors: John Mayes, Washoe Valley, NV (US); George R. McDermand, Carson City, NV (US)

(73) Assignee: Flight Level Design Partners, LLC, Reno, NV (US)

( * ) Notice: Subject to any disclaimer, the term of this patent is extended or adjusted under 35 U.S.C. 154(b) by 0 days.

(21) Appl. No.: 15/480,631

(22) Filed: Apr. 6, 2017

(51) Int. Cl.
| | |
|---|---|
| *H04M 1/04* | (2006.01) |
| *H05K 5/02* | (2006.01) |
| *F16B 5/00* | (2006.01) |
| *G06F 1/16* | (2006.01) |

(52) U.S. Cl.
CPC ............. *H05K 5/0234* (2013.01); *F16B 5/00* (2013.01); *G06F 1/1633* (2013.01); *H04M 1/04* (2013.01)

(58) Field of Classification Search
CPC .......... F16M 11/40; F16M 11/04; F16M 1/38; H04M 1/04; G06F 1/1613
USPC ........................................ 361/679.56, 679.59
See application file for complete search history.

(56) References Cited

U.S. PATENT DOCUMENTS

| | | | | | |
|---|---|---|---|---|---|
| 5,694,468 | A * | 12/1997 | Hsu | ..................... | B60R 11/0241 379/426 |
| 7,828,259 | B2 * | 11/2010 | Wang | ..................... | B60R 11/02 248/316.4 |
| 8,066,241 | B2 * | 11/2011 | Yu | ........................ | F16M 11/041 248/286.1 |
| 8,424,825 | B2 * | 4/2013 | Somuah | ............. | B60R 11/0235 248/130 |
| 8,576,557 | B2 * | 11/2013 | Chu | ....................... | F16M 13/00 361/679.26 |
| D713,395 | S * | 9/2014 | Godycki | ...................... | D14/250 |
| D764,478 | S * | 8/2016 | Radmard | .............. | H04M 1/185 D14/250 |
| 9,433,287 | B2 * | 9/2016 | Chen | .................... | A47B 23/044 |
| 9,450,430 | B2 * | 9/2016 | Fuller | .................. | H02J 7/0044 |
| 9,483,079 | B2 * | 11/2016 | Huang | .................. | G06F 1/1637 |
| 9,664,214 | B1 * | 5/2017 | Gupta | ....................... | F16B 2/10 |
| 2005/0205728 | A1 * | 9/2005 | Avery | ...................... | A45F 5/00 248/149 |
| 2009/0218454 | A1 * | 9/2009 | Stanley | .................. | F16M 13/00 248/121 |
| 2010/0134984 | A1 * | 6/2010 | Lum | ..................... | G06F 1/1632 361/725 |

(Continued)

*Primary Examiner* — Xanthia C Cunningham
(74) *Attorney, Agent, or Firm* — Hawley Troxell Ennis & Hawley LLP; Philip J. McKay

(57) ABSTRACT

An electronic mobile device holder includes a first support member and a second support member coupled together to carry an electronic mobile device. The first support member includes a first slot and the second support member includes a second slot. The first slot couples to the second support member and the second slot couples to the first support member to couple the first support member to the second support member to provide a platform that carries the electronic mobile device. The electronic mobile device holder can be disassembled and inserted into a card slot of a wallet or a card slot of an electronic mobile device case for convenient storage and carrying. The electronic mobile device holder enables hands-free viewing of a screen of a mobile electronic device.

13 Claims, 11 Drawing Sheets

(56) References Cited

U.S. PATENT DOCUMENTS

| | | | | |
|---|---|---|---|---|
| 2011/0170246 A1* | 7/2011 | Chu | ............... | F16M 13/00 |
| | | | | 361/679.01 |
| 2011/0259771 A1* | 10/2011 | Johnson | ............ | A45C 11/00 |
| | | | | 206/320 |
| 2012/0312936 A1* | 12/2012 | Huang | ............ | F16M 11/041 |
| | | | | 248/122.1 |
| 2013/0134284 A1* | 5/2013 | Hu | ............... | F16M 11/041 |
| | | | | 248/451 |
| 2014/0252786 A1* | 9/2014 | Singhal | ............ | G06F 1/1626 |
| | | | | 294/137 |
| 2015/0355531 A1* | 12/2015 | Ben Yehuda | ........ | F16M 11/041 |
| | | | | 396/425 |

* cited by examiner

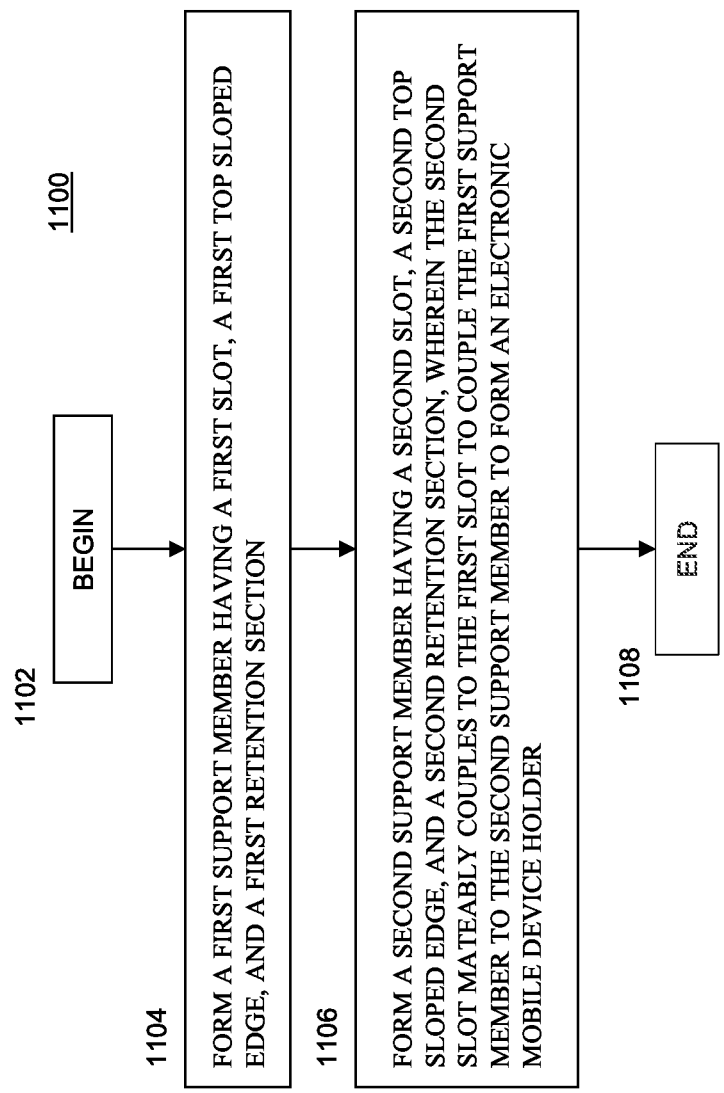

ELECTRONIC MOBILE DEVICE HOLDER

BACKGROUND

Smart phones, tablets, and other electronic mobile devices enable users of the devices to conveniently perform both business and recreational operations. Users of electronic mobile devices can perform operations such as participate in a video conference, make telephone calls, watch movies, read and respond to electronic mail ("email"), manipulate spreadsheets, play games, organize budgets, or otherwise recreate, perform business, and/or interact with other people. While some of these operations or functions may be performed while holding the electronic mobile device in one or two hands, other functions or services are more conveniently performed or received from an electronic mobile device in a hands-free environment. In other words, while video conferencing, watching a movie, or interacting with the electronic mobile device with a keyboard or mouse, interaction with the electronic mobile device is easier, more enjoyable, and/or more effective while not having to hold the electronic mobile device.

Some existing solutions are already available for propping up an electronic mobile device to allow the user to watch or interact with the electronic mobile device without holding the electronic mobile device with one or two hands. However, these solutions are bulky, difficult to carry, significantly add to the thickness of the phone, and/or are difficult to use. For example, some smart phone cases (e.g., after-market cases that are added around the case of the smart phone) are configured to prop a phone up on a table of flat surface to enable hands-free interaction with the smart phone. However, these types of cases regularly double the thickness of the smart phone and sometime match the weight of the smart phone, added both bulk and weight to the device. Other existing solutions are similarly cumbersome or come with other inconvenient drawbacks, such as being difficult to set up to hold the smart phone at a good angle.

What is needed is an electronic mobile device holder that enables hands-free viewing of an electronic mobile device.

SUMMARY

Embodiments of the present disclosure include an electronic mobile device holder that facilitates no-hands viewing and/or interaction with an electronic mobile device. The electronic mobile device holder breaks down into dimensions that are approximately the size of a credit card, or smaller, to enable a user to slide the disassembled electronic mobile device holder into card-holder slots of a wallet, purse, or electronic mobile device case, according to various embodiments. The electronic mobile device holder comprises two support members that couple together and allow a user to rest an electronic mobile device in a semi-upright orientation so that the user can conveniently view or interact with the screen of the electronic mobile device. The support members couple together by sliding slots together, which forms a stable weight bearing platform for an electronic mobile device, according to one embodiment. When coupled together (e.g., by sliding slots together), the support members are substantially perpendicular to each other, forming a stable platform by which to carry an electronic mobile device, according to one embodiment.

These and other embodiments are disclosed in more detail below.

BRIEF DESCRIPTION OF THE DRAWINGS

FIG. 11 is a flow diagram of a process for manufacturing an electronic mobile device holder, in accordance with one embodiment.

Figure 1:
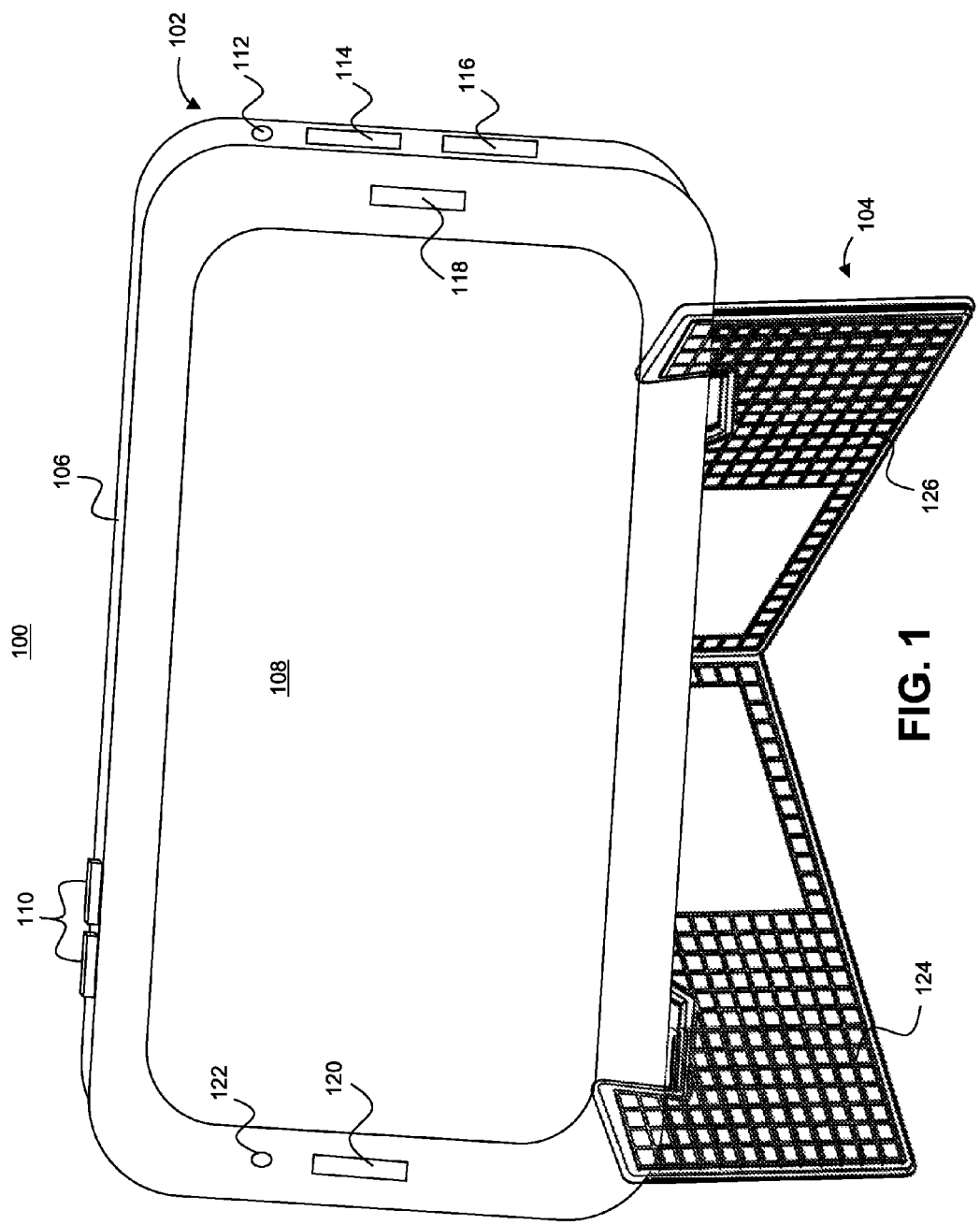
FIG. 1 is a diagram of an isometric view of an electronic mobile device holder system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DISCLOSURE

Embodiments will now be discussed with reference to the accompanying Figures, which depict one or more example embodiments of an electronic mobile device holder. Embodiments may be implemented in many different forms and should not be construed as limited to the embodiments set forth herein, shown in the Figures, and/or described below. Rather, these examples of embodiments are provided to allow a complete disclosure that conveys the principles of the invention, as set forth in the claims, to those of skill in the art.

Public availability and use of electronic mobile devices has increased significantly as the manufacturing costs and purchase prices of electronic mobile devices decrease. With increased availability, electronic mobile devices are applied and used in a greater variety of environments. Accordingly, convenient systems and apparatuses for propping up, carrying, or holding electronic mobile devices have become increasingly more desirable.

FIG. 1 illustrates an isometric view of an electronic mobile device holder system 100 for providing hands-free viewing and/or interaction with an electronic mobile device, according to one embodiment. The electronic mobile device holder system 100 includes an electronic mobile device 102 and an electronic mobile device holder 104, according to one embodiment. The electronic mobile device 102 is a cell phone or smart phone, according to the specific illustrative embodiment of FIG. 1. In other embodiments, the electronic mobile device 102 is a phablet, tablet, or other electronic mobile device.

The electronic mobile device 102 includes various features that enable a user to interact with the electronic mobile device 102, according to one embodiment. The electronic mobile device 102 includes, but is not limited to, one or more of an enclosure 106, a screen 108, one or more physical buttons 110, an audio port 112, a power port 114, a speaker 116, a microphone 118, a speaker 120, and a camera 122, according to one embodiment. The electronic mobile device 102 rests on the electronic mobile device holder 104 in a relatively upright position (e.g., with an incline of approximately 40-60 degrees) to conveniently enable hands-free viewing of and/or interaction with the screen 108, according to one embodiment.

The electronic mobile device holder 104 is configured to carry the electronic mobile device 102 to conveniently enable hands-free viewing and/or interaction with the electronic mobile device 102, according to one embodiment. The electronic mobile device holder 104 includes a first support member 124 and a second support member 126, which are coupled together to provide a platform that carries the electronic mobile device 102, according to one embodiment. The first support member 124 and the second support member 126 are detachably coupled together to enable a user to conveniently assemble and disassemble the electronic mobile device holder 104, according to one embodiment. When disassembled, the electronic mobile device holder 104 comprises the first support member 124 detached from the second support member 126, which can be stored together in a user's pocket, wallet, or electronic mobile device case, according to various embodiments. Each of the first support member 124 and the second support member 126 have dimensions that are approximately equal to or less than ISO/IEC 7810 ID-1 sized cards (e.g. credit cards), to enable the disassembled electronic mobile device holder 104 to fit into a card (e.g., credit card, driver's license, insurance card, etc.) slot of a wallet, purse, or electronic mobile device case, according to one embodiment. In one embodiment, a longest edge dimension or edge length of the first support member 124 and of the second support member 126 is approximately 3.370 inches (85.60 mm), which is the ISO/IEC 7810 ID-1 size specification for an identification or financial card. In one embodiment, the longest edge dimension or edge length of the first support member 124 and of the second support member 126 is 3.375 inches, but is still configured to conveniently fit/slide into sleeves or slots that are designed for ISO/IEC 7810 ID-1 compliant cards. In one embodiment, a second longest edge dimension or edge height of the first support member 124 and of the second support member 126 is less than or equal to 2.125 inches (53.98 mm), which is the ISO/IEC 7810 ID-1 size specification for an identification or financial card, to enable insertion and removal of the disassembled electronic mobile device holder 104 from sleeves or slots that are designed for ISO/IEC 7810 ID-1 compliant cards.

Figure 2:
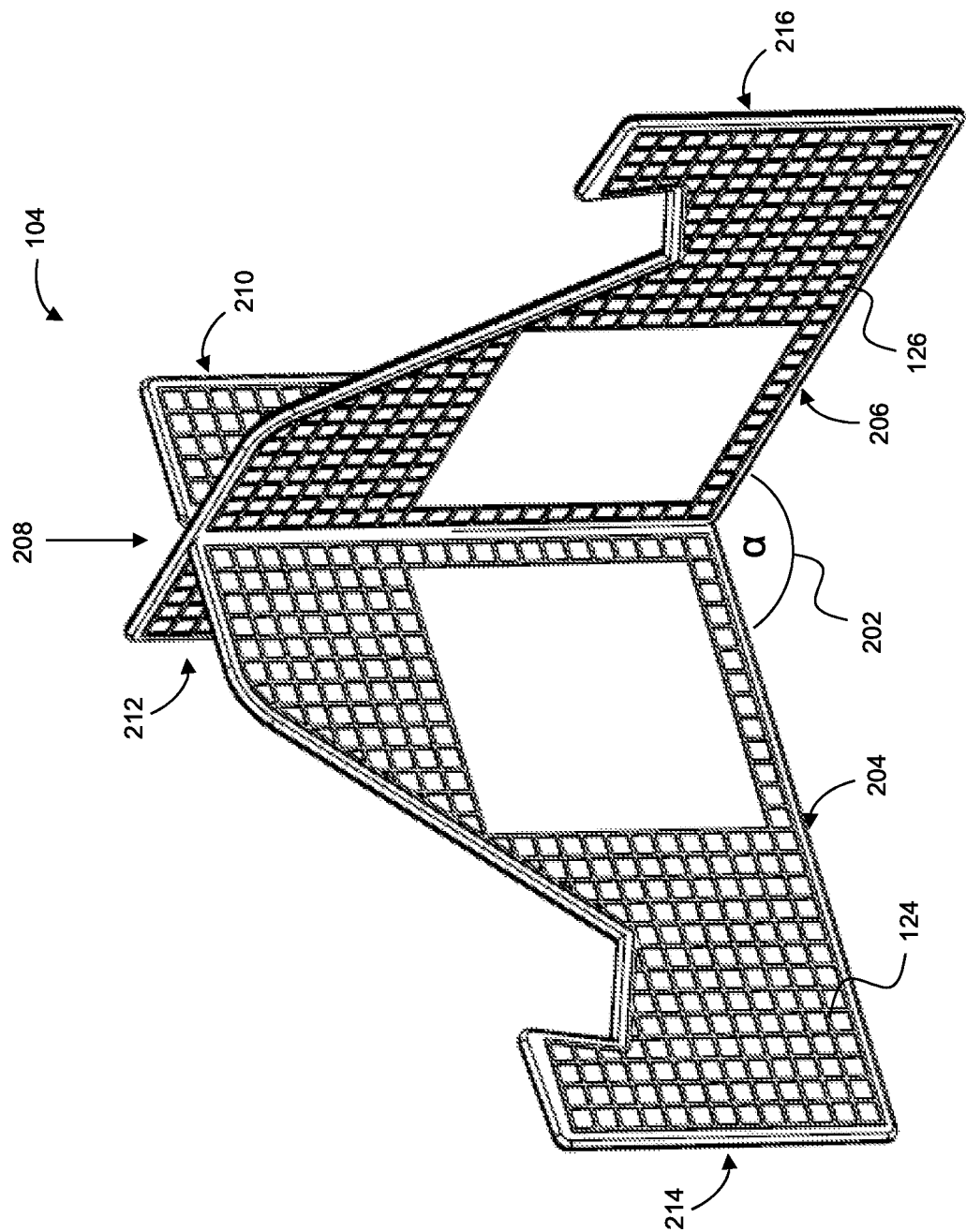
FIG. 2 is a diagram of an isometric view of an electronic mobile device holder, in accordance with one embodiment.

FIG. 2 illustrates an isometric view of the electronic mobile device holder 104, according to one embodiment. The electronic mobile device holder 104 is constructed from one or more of a variety of materials. The material used in the construction of the first support member 124 and the second support member 126 of the electronic mobile device holder 104 includes, but is not limited to, one or more of plastic, aluminum, steel, vinyl, polyvinyl chloride ("PVC"), nylon (e.g., Dupont 610 nylon), fiberglass, carbon fiber, fiberglass-aluminum mix, and carbon fiber-aluminum mix, according to various embodiments. The first support member 124 and a second support member 126 are manufactured by cutting the first support member 124 and the second support member 126 from a sheet of material (e.g., aluminum), according to one embodiment. The first support member 124 and the second support member 126 are manufactured by stamping the first support member 124 and the second support member 126 from vinyl (e.g., PVC), according to one embodiment. The first support member 124 and the second support member 126 are manufactured by injection molding, according to one embodiment. The first support member 124 and the second support member 126 are manufactured using 3D printer technology, according to one embodiment. In one embodiment, the first support member 124 and the second support member 126 are manufactured with a polygonal pattern (e.g., squares, triangles, hexagons, etc.) with raised lines of manufacture material along the borders of the polygonal patterns to increase the strength and decrease the weight of the first support member 124 and the second support member 126, as illustrated. In one embodiment, the surfaces of the first support member 124 and the second support member 126 are smooth.

The electronic mobile device holder 104 includes an angle 202 between an inner surface 204 of the first support member 124 and between an inner surface 206 of the second support member 126, according to one embodiment. The angle 202 (represented by the Greek lower case letter 'a') is fixed at 90 degrees, according to one embodiment. The angle 202 is fixed at 90 degrees and is defined by slots that are formed in the first support member 124 and in the second support member 126, according to one embodiment. The angle 202 is fixed at an angle that is less than 90 degrees (e.g., 50, 60, 70 degrees, etc.), according to one embodiment. The angle 202 is designed to provide a stable platform from which users can view and operate their electronic mobile devices, according to one embodiment.

The angle 202 is adjustable as the first support member 124 and the second support member 126 rotate about an axis 208, according to one embodiment. The angle 202 is adjustable from 0-90 degrees as a user swings the first support member 124 towards and/or away from the second support member 126, according to one embodiment. The angle 202 is adjustable from 90 degrees to a smaller angle that is greater than 0 degrees, to enable the electronic mobile device holder 104 to adjust for different widths, lengths, and/or sizes of electronic mobile devices, according to one embodiment. The first support member 124 includes a slot and the second support member 126 includes a slot that mateably couples to the slot of the first support member 124 along the axis 208, according to one embodiment. The slot of the first support member 124 includes edges that are beveled, rounded, or angled to enable the first support member 124 and the second support member 126 to swing towards each other to decrease the angle 202 to an angle that is less than 90 degrees, according to one embodiment. The slot of the first support member 124 includes edges that are beveled, rounded, or angled so as to stop the first support member 124 and the second support member 126 from swinging away from each other in such a manner that causes the angle 202 to exceed 90 degrees, according to one embodiment. The slot of the second support member 126 includes edges that are beveled, rounded, or angled to enable the first support member 124 and the second support member 126 to swing towards each other and decrease the angle 202 to an angle that is less than 90 degrees, according to one embodiment. The slot of the second support member 126 includes edges that are beveled, rounded, or angled so as to stop the first support member 124 and the second support member 126 from swinging away from each other in such a manner that causes the angle 202 to exceed 90 degrees, according to one embodiment. In one embodiment, when the first support member 124 is positioned towards the second support member 126 so that the angle 202 is 0 degrees, the first support member 124 locks into the second support member 126 so that the first support member 124 and the second support member 126 stay locked together to enable a user to conveniently stow the electronic mobile holder 104 in a pocket, sleeve, wallet, purse, or other storage location.

In accordance with other embodiments (not shown), the first support member 124 and the second support member 126 are coupled together with other techniques to enable users to increase and decrease the angle 202 between the first support member 124 and the second support member 126. In one embodiment, the first support member 124 includes a first proximal end 210, and the second support member 126 includes a second proximal end 212. The first support member 124 is coupled to the second support member 126 by coupling the first proximal end 210 to the second proximal end 212, according to one embodiment. The first proximal end 210 is coupled to the second proximal end 212 with a binding (not shown), according to one embodiment. An example of a binding that is used to couple the first proximal end 210 to the second proximal end 212 includes tape, such as cloth tape, aircraft quality speed tape, or other materials that can be adhered to the first support member 124 and the second support member 126 and enable the electronic mobile device holder 104 to operably open and shut (e.g., for use and for storage), according to one embodiment. Another example of a binding that is used to couple the first proximal end 210 to the second proximal end 212 includes a hinge (not shown), according to one embodiment. The hinge is operable with a removable pin (not shown) that is inserted into the hinge for use and that is removed from the hinge for storage of the electronic mobile device holder 104, according to one embodiment. With the pin inserted into the hinge, the angle 202 is fixed at approximately 90 degrees, according to one embodiment. With the pin inserted into the hinge, the angle 202 is variable between approximately 0 degrees and 90 degrees, according to one embodiment. In one embodiment, the first support member 124 includes a first distal end 214, and the second support member 126 includes a second distal end 216. The first distal end 214 is an edge of the first support member 124 that is on an opposite side of the first support member 124 than the first proximal end 210, according to one embodiment. The second distal end 216 is an edge of the second support member 126 that is on an opposite end of the second proximal end 212 than the second proximal end 212, according to one embodiment.

Figure 3:
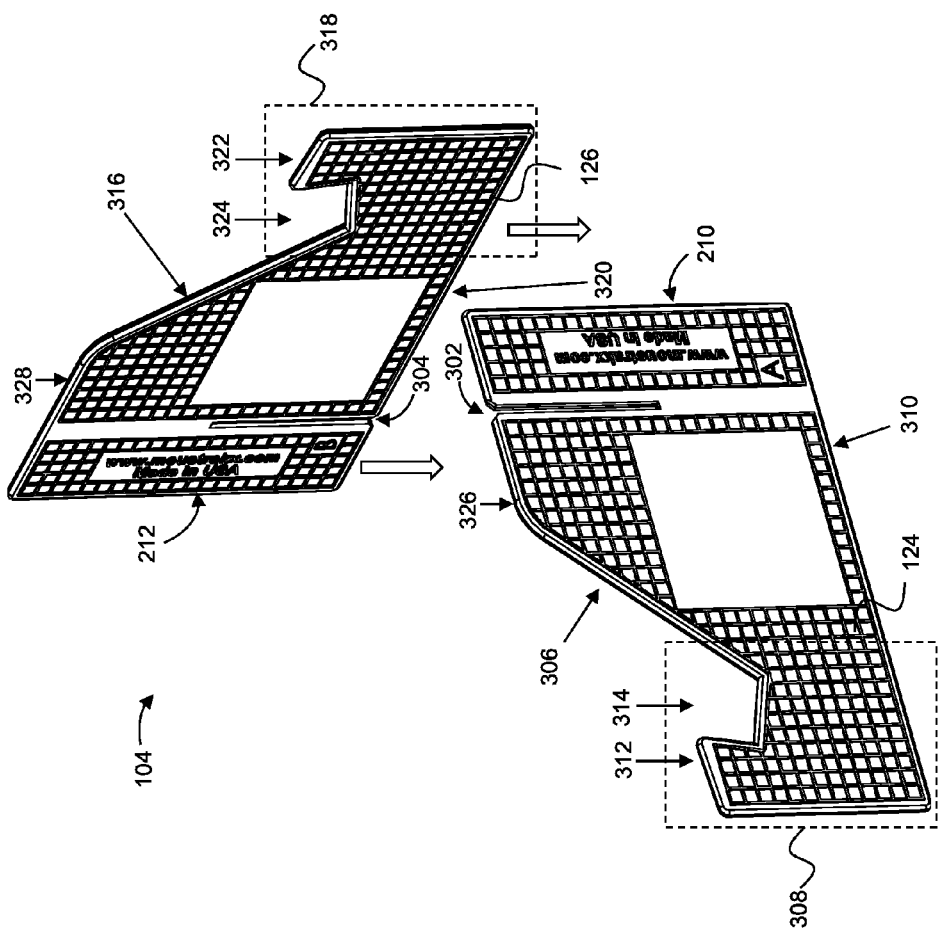
FIG. 3 is a diagram of an isometric view of an electronic mobile device holder, in accordance with one embodiment.

FIG. 3 illustrates an isometric view of the first support member 124 decoupled from the second support member 126 of the electronic mobile device holder 104, according to one embodiment. The first support member 124 includes a first slot 302 and the second support member 126 includes a second slot 304, which slots slide together to mateably couple the first support member 124 to the second support member 126, according to one embodiment. The first support member 124 couples to the second support member 126 by aligning the first slot 302 with the second slot 304 and by applying upward force to the first support member 124 and/or by applying a downward force on the second support member 126, while the first slot 302 is aligned with the second slot 304, according to one embodiment.

The first support member 124 includes first top sloped edge 306 and a first retention section 308 for carrying, holding, and/or cradling an electronic mobile device in a propped up or semi-upright position, according to one embodiment. A rear surface of the electronic mobile device (not shown) rests on the first top sloped edge 306, according to one embodiment. The first top sloped edge 306 descends from the first proximal end 210 towards the first retention section 308, according to one embodiment. The slope of the first top sloped edge 306 is fixed at an angle between 30-60 degrees, with reference to a first bottom edge 310 of the first support member 124, according to one embodiment. The slope of the first top sloped edge 306 enables users to conveniently view and interact with the electronic mobile device, according to one embodiment. If the slope of the first top sloped edge 306 were 0 degrees, the first top sloped edge 306 would be parallel to the first bottom edge 310 and would position the electronic mobile device in an orientation that would make viewing of the electronic mobile device difficult for a user. Similarly, if the slope of the first top sloped edge 306 were 90 degrees, the first top sloped edge 306 would be perpendicular to the first bottom edge 310 and would position the electronic mobile device in an orientation that would make viewing of the electronic mobile device difficult for a user.

The first retention section 308 prevents an electronic mobile device from sliding off of the electronic mobile device holder 104, according to one embodiment. The first retention section 308 includes a first raised ridge 312 and a first trough 314 for retaining a lower portion of an electronic mobile device, according to one embodiment. The first retention section 308 retains a lower edge and/or a lower section of a housing of the electronic mobile device, according to one embodiment. The first raised ridge 312 is undercut by the first trough 314 such that a lower width of the first raised ridge 312 is narrower than an upper width of the first raised ridge 312, according to one embodiment.

The first trough 314 includes one or more of a variety of shapes, according to various embodiments. The first trough 314 is polygonal, according to one embodiment. The first trough 314 is polygonal and includes one corner (e.g., is triangular), includes two corners (e.g., is rectangular), or includes multiple corners and is polygonal and arcuate, according to one embodiment. The first trough 314 is semi-circular or concavely arcuate, according to one embodiment. The first trough 314 cradles the bottom edge, section, or portion of an electronic mobile device that is carried by the electronic mobile device holder 104, according to one embodiment. The first trough 314 is defined by the first top sloped edge 306 on one side and is defined by the first raised ridge 312 on another side, according to one embodiment. The first retention section 308 is a means for retaining an electronic mobile device against a sloped edge, according to one embodiment.

The second support member 126 includes second top sloped edge 316 and a second retention section 318 for carrying, holding, and/or cradling an electronic mobile device in a propped up or semi-upright position, according to one embodiment. A rear surface of the electronic mobile device (not shown) rests on the second top sloped edge 316, according to one embodiment. The second top sloped edge 316 descends from the second proximal end 212 towards the second retention section 318, according to one embodiment. The slope of the second top sloped edge 316 is fixed at an angle between 30-60 degrees, with reference to a second bottom edge 320 of the second support member 126, according to one embodiment. The slope of the second top sloped edge 316 enables users to conveniently view and interact with the electronic mobile device, according to one embodiment.

The second retention section 318 (in combination with the first retention section 308) prevents an electronic mobile device from sliding off of the electronic mobile device holder 104, according to one embodiment. The second retention section 318 includes a second raised ridge 322 and a second trough 324 for retaining a lower portion of an electronic mobile device, according to one embodiment. The second retention section 318 retains a lower edge and/or a lower section of a housing of the electronic mobile device, according to one embodiment. The second raised ridge 322 is undercut by the second trough 324 such that a lower width of the second raised ridge 322 is narrower than an upper width of the second raised ridge 322, according to one embodiment. The second trough 324 is polygonal, according to one embodiment. The second trough 324 is polygonal and includes one corner (e.g., is triangular), includes two corners (e.g., is rectangular), or includes multiple corners and is polygonal and arcuate, according to one embodiment. The second trough 324 is semi-circular or concavely arcuate, according to one embodiment. The second trough 324 cradles the bottom edge, section, or portion of an electronic mobile device that is carried by the electronic mobile device holder 104, according to one embodiment. The second trough 324 is defined by the second top sloped edge 316 on one side and is defined by the second raised ridge 322 on another side, according to one embodiment. The second retention section 318 is a means for retaining an electronic mobile device against a sloped edge, according to one embodiment. In one embodiment, the first retention section 308 and the second retention section 318 together form a means for retaining an electronic mobile device against sloped edges of the electronic mobile device holder 104.

In one embodiment, the first top sloped edge 306 and the second top sloped edge 316 are concave instead of straight in order to more securely mate with electronic mobile devices having convexly curved back surfaces, according to one embodiment. The more contact the first and second top sloped edges 306, 316 make with a back surface of an electronic mobile device, the more the electronic mobile device holder 104 will provide an aesthetic and stable propped up orientation of the electronic mobile device being carried, according to one embodiment.

In one embodiment, the first support member 124 includes a first top flat edge 326 that transitions into the first top sloped edge 306 towards the first retention section 308, according to one embodiment. In one embodiment, the second support member 126 includes a second top flat edge 328 that transitions into the second top sloped edge 316 towards the second retention section 318, according to one embodiment. The first slot 302 is partially formed in the first top flat edge 326 approximately half way between the first proximal end 210 and a transition into the first top sloped edge 306, according to one embodiment. The second slot 304 is partially formed in the second bottom edge 320 between 0.5 inches and 0.75 inches from the second proximal end 212, according to one embodiment.

Figure 4:
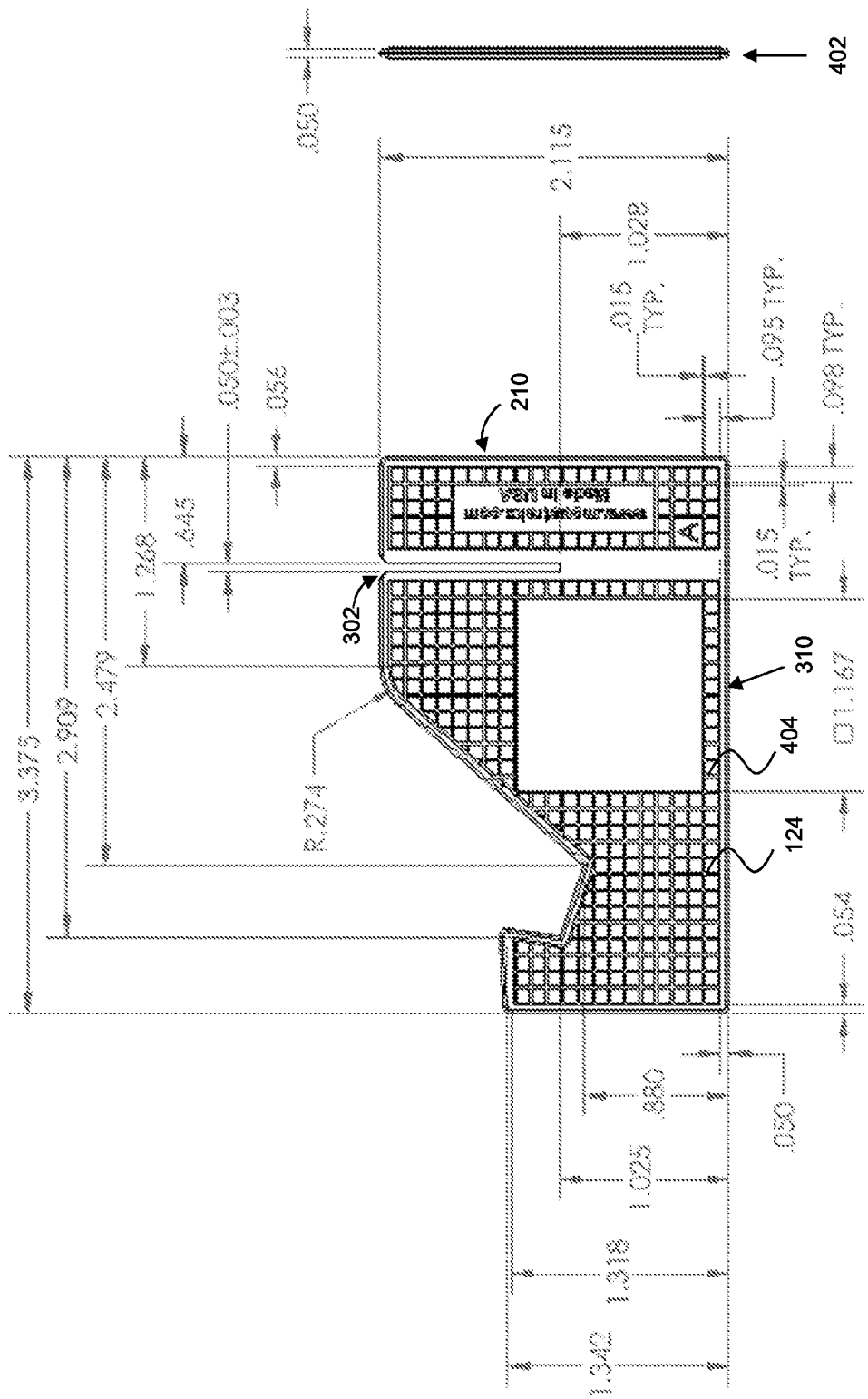
FIG. 4 is a diagram of a side view of part of an electronic mobile device holder, in accordance with one embodiment.

FIG. 4 illustrates a side view of the first support member 124 with examples of dimensions of the edges, surfaces, and features of the first support member 124, according to a specific illustrative embodiment of FIG. 4. The first bottom edge 310 includes a length of 3.375 inches or a length that is less than 3.4 inches, so that the first support member 124 complies with or substantially complies with a length dimension of the ISO/IEC 7810 ID-1 standard, according to one embodiment. The first proximal end 210 includes a height of 2.115 inches or a height that is less than 2.2 inches, so that the first support member 124 complies with or substantially complies with a height dimension or height limitation of the ISO/IEC 7810 ID-1 standard, according to one embodiment. The width 402 of a first body 404 of the first support member 124 is 0.030 inches (in compliance with the ISO/IEC 7810 ID-1 standards), is 0.050 inches, or is some other width between 0.001 inches and 0.1 inches that provides stability and a thin profile for convenient storage in a card slot of a wallet or electronic mobile device case, according to various embodiments. The first support member 124 includes one or more of the illustrated examples of dimensions for providing hands-free viewing and/or interaction with an electronic mobile device that is propped up or carried by the electronic mobile device holder 104 (not shown), according to one embodiment.

Figure 5:
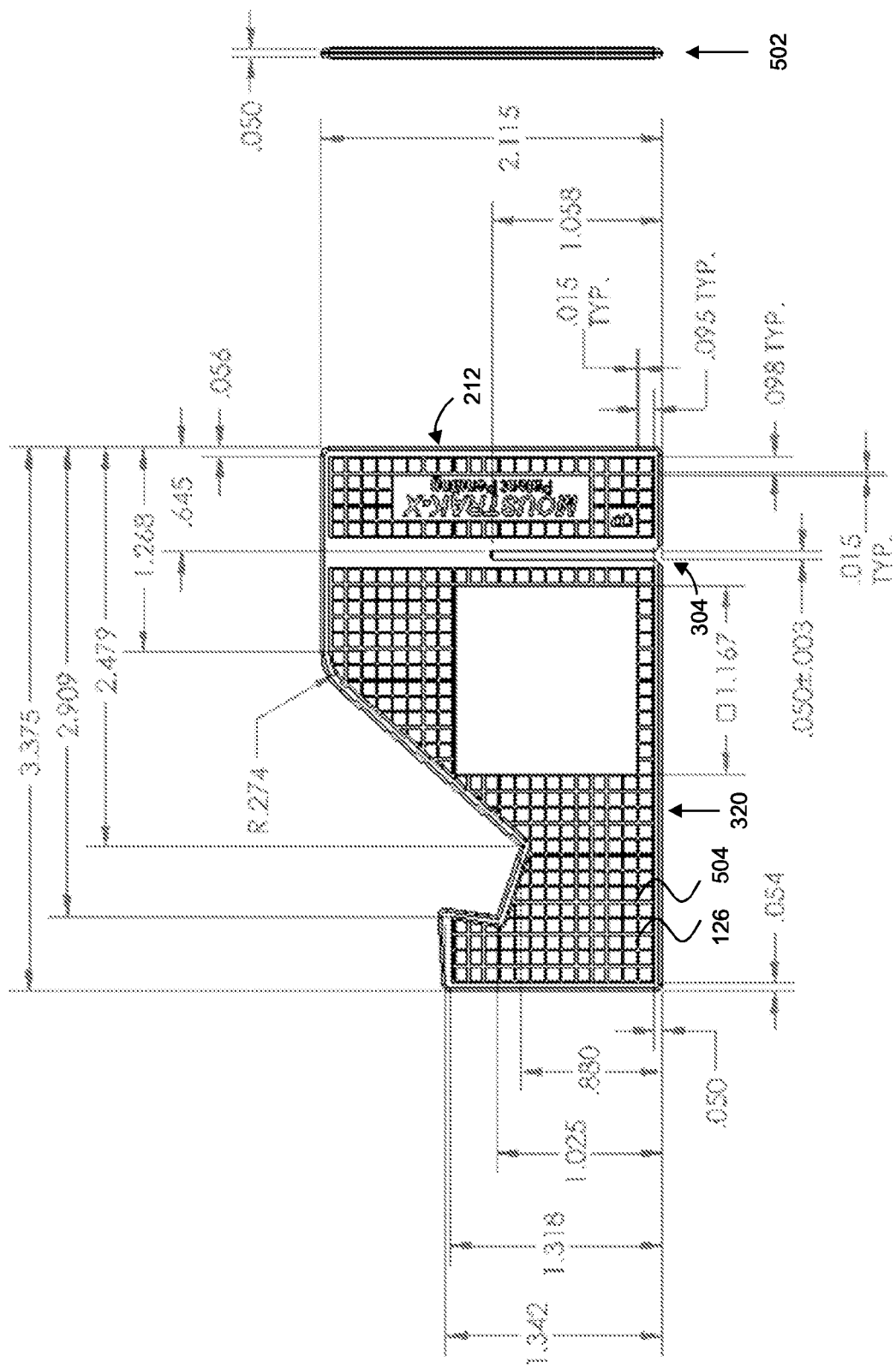
FIG. 5 is a diagram of a side view of part of an electronic mobile device holder, in accordance with one embodiment.

FIG. 5 illustrates a side view of the second support member 126 with examples of dimensions of the edges, surfaces, and features of the second support member 126, according to a specific illustrative embodiment of FIG. 5. The second bottom edge 320 includes a length of 3.375 inches or a length that is less than 3.4 inches, so that the second support member 126 complies with or substantially complies with a length dimension of the ISO/IEC 7810 ID-1 standard, according to one embodiment. The second proximal end 212 includes a height of 2.115 inches or a height that is less than 2.2 inches, so that the second support member 126 complies with or substantially complies with a height dimension or height limitation of the ISO/IEC 7810 ID-1 standard, according to one embodiment. The width 502 of a second body 504 the second support member 126 is 0.030 inches (in compliance with the ISO/IEC 7810 ID-1 standards), is 0.050 inches, or is some other width between 0.001 inches and 0.1 inches that provides stability and a thin profile for convenient storage in a card slot of a wallet or electronic mobile device case, according to various embodiments. The second support member 126 includes one or more of the illustrative examples of dimensions for providing hands-free viewing and/or interaction with an electronic mobile device that is propped up or carried by the electronic mobile device holder 104 (not shown), according to one embodiment.

Figure 6:
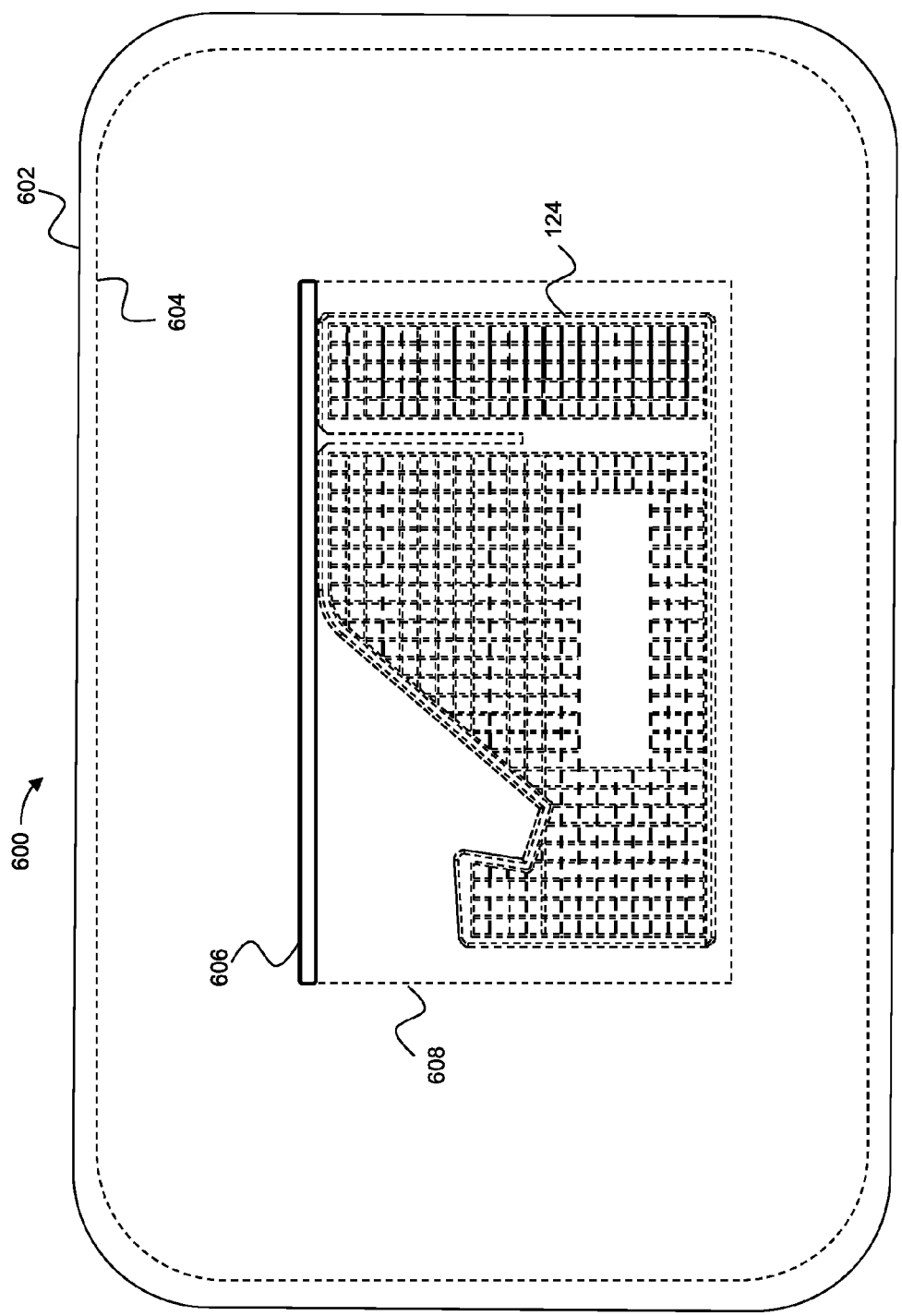
FIG. 6 is a diagram of a system for carrying an electronic mobile device holder, in accordance with one embodiment.

FIG. 6 illustrates a diagram of a system 600 for carrying, storing, and securing, an electronic mobile device holder (not shown), as disclosed herein, according to one embodiment. The system 600 includes a rear view of an electronic mobile device case 602, an electronic mobile device 604, a card slot 606 in the electronic mobile device case 602, and a card pocket 608 in the electronic mobile device case 602, according to one embodiment. The electronic mobile device case 602 is an example of an after-market case that at least partially encloses the electronic mobile device 604 to reduce the risk of breaking and/or damaging the electronic mobile device 604, according to one embodiment. The card slot 606 enables the user to slide the first support member 124 and/or the second support member 126 (not shown) into the card pocket 608 in the electronic mobile device case 602, according to one embodiment. The card slot 606 and the card pocket 608 are an example of card slots and card pockets that are used in wallets, purses, and/or electronic mobile device cases, for storing, securing, and carrying credit cards and identification cards, according to one embodiment.

Figure 7:
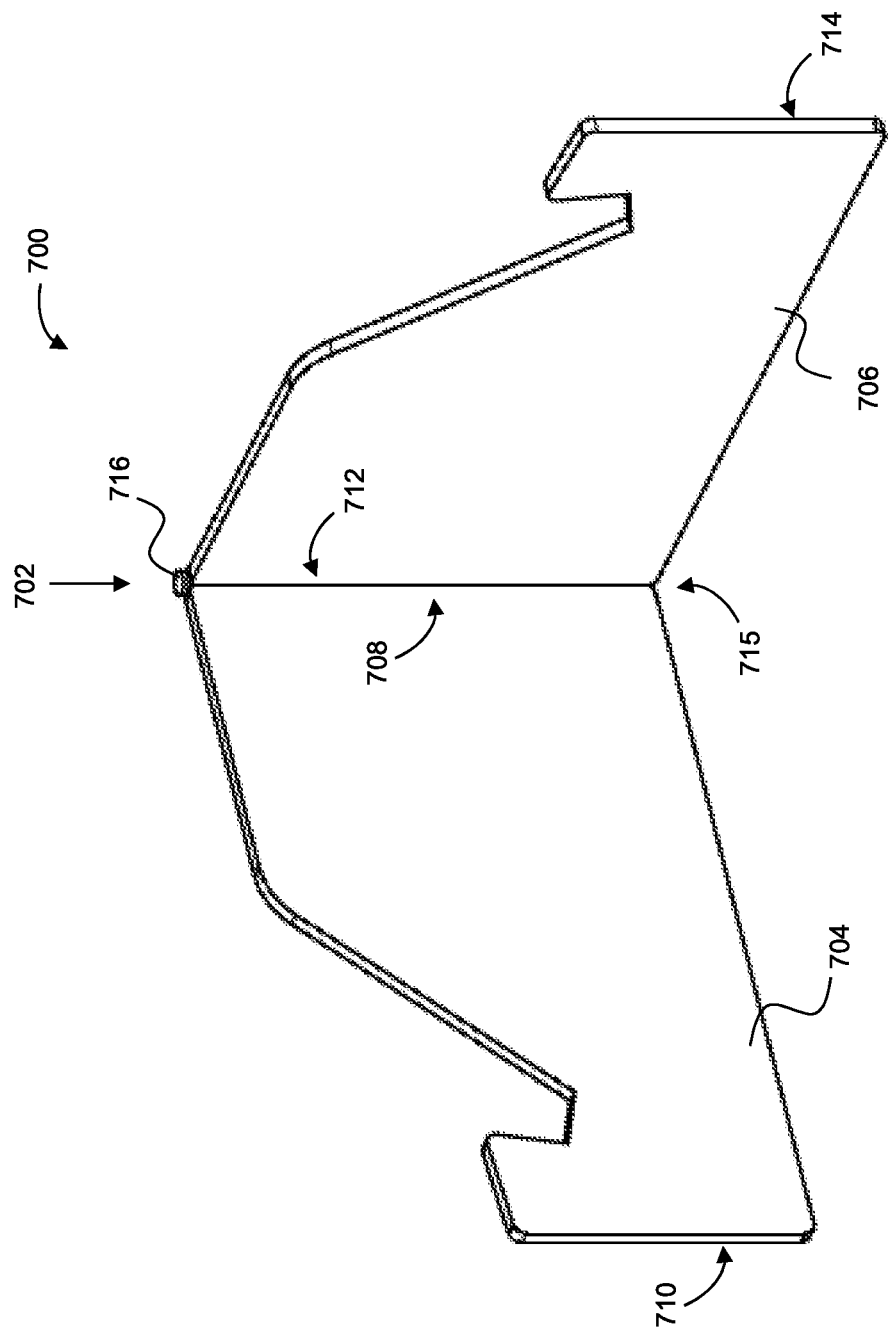
FIG. 7 is a diagram of an isometric view of an electronic mobile device holder, in accordance with one embodiment.

FIG. 7 illustrates a diagram of an electronic mobile device holder 700 that is configured to open and close with a hinged axis 702, according to one embodiment. The electronic mobile device holder 700 includes a first support member 704 and a second support member 706 that carry an electronic mobile device to enable hands-free viewing and operation of an electronic mobile device, according to one embodiment. In one embodiment, the dimensions of the first support member 704 are the same as or are approximately the same as the first support member 124 (shown in FIG. 4), according to one embodiment. In one embodiment, the dimensions of the second support member 706 are the same as or are approximately the same as the second support member 126 (shown in FIG. 5), according to one embodiment.

The first support member 704 includes a first proximal end 708 and a first distal end 710, according to one embodiment. The second support member 706 includes a second proximal end 712 and a second distal end 714, according to one embodiment. The electronic mobile device holder 700 includes a hinge 715 that includes a hinge pin 716, the first support member 704 as a first leaf of the hinge 715, the second support member 706 as a second leaf of the hinge 715, according to one embodiment. The electronic mobile device holder 700 hinges or pivots at the first proximal end 708 and the second proximal end 712 on the hinge pin 716 about the hinged axis 702, according to one embodiment. In one embodiment, a user stores the electronic mobile device holder 700 by swinging the first distal end 710 and the second distal end 714 about the hinged axis 702 until the first distal end 710 and the second distal end 714 meet together so that the first support member 704 lays approximately flat against the second support member 706, according to one embodiment. In one embodiment, the hinge pin 716 can be (slidably) inserted and removed from the hinge 715 by sliding the hinge pin 716 along the hinged axis 702. In one embodiment, the first support member 704 lays flat against the second support member 706 when the hinge pin 716 is removed.

Figure 8:
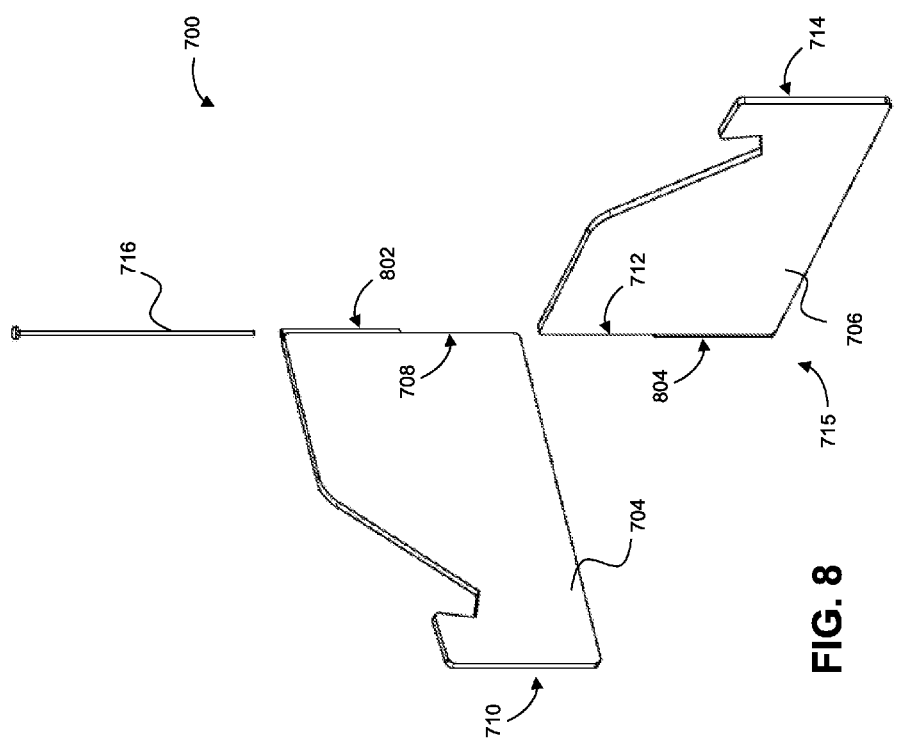
FIG. 8 is a diagram of an isometric view of an electronic mobile device holder, in accordance with one embodiment.

FIG. 8 illustrates an exploded view of the electronic mobile device holder 700, according to one embodiment. The hinge 715 includes one or more first knuckles 802 on the first support member 704 and one or more second knuckles 804 on the second support member 706, according to various embodiments. For example, the one or more first knuckles 802 can include one, two, or more knuckles for receiving the hinge pin 716, and the one or more second knuckles 804 can include one, two, or more knuckles couple with the hinge pin 716 and the one or more first knuckles 802, according to various embodiments.

Figure 9:
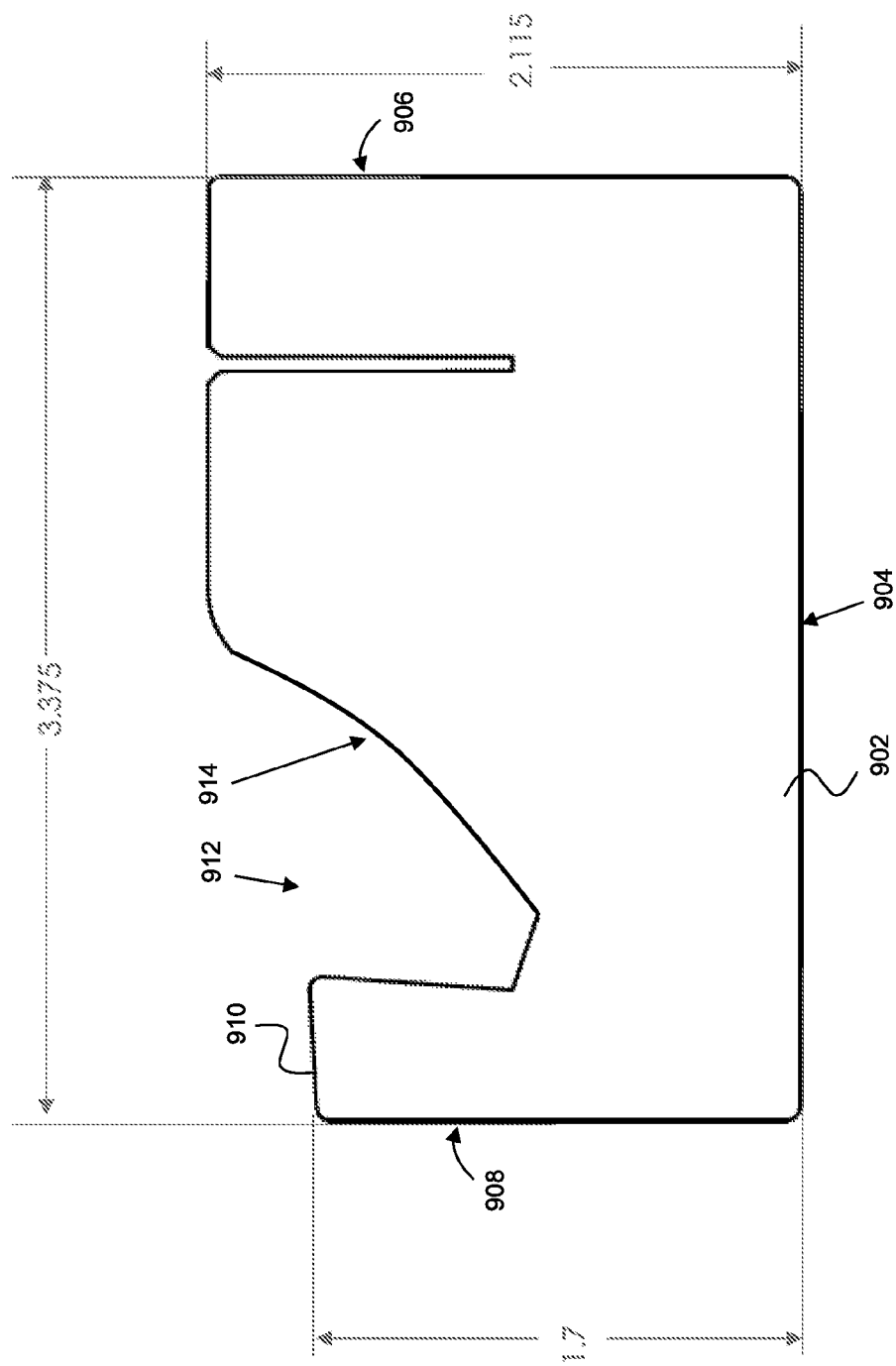
FIG. 9 is a diagram of a side view of part of an electronic mobile device holder, in accordance with one embodiment.

FIG. 9 illustrates a side view of a first support member 902 with examples of dimensions of the first support member 902, according to a specific illustrative embodiment of FIG. 9. The first support member 902 includes a first bottom edge 904 having a length of 3.375 inches or a length that is less than 3.4 inches, so that the first support member 902 complies with or substantially complies with a length dimension of the ISO/IEC 7810 ID-1 standard, according to one embodiment. The first support member 902 includes a first proximal end 906 having a height of 2.115 inches or a height that is less than 2.2 inches, so that the first support member 902 complies with or substantially complies with a height dimension or height limitation of the ISO/IEC 7810 ID-1 standard, according to one embodiment. The first support member 902 includes a first distal end 908 having a height of 1.7 inches or a height that is greater than 1.3 inches and less than 2.2 inches, so that a raised ridge 910 at least partially forms a trench 912 to support carrying a variety of sizes of electronic mobile devices, according to one embodiment. For example, with a first distal end 908 having a height in the range of 1.5-1.8 inches, the first support member 902 (joined with the second support member 1002 of FIG. 10) can support a phablet, tablet or other electronic mobile device that is larger than a smart phone. The first support member 902 includes one or more of the illustrated examples of dimensions for providing hands-free viewing and/or interaction with an electronic mobile device that is propped up or carried by an electronic mobile device holder (not shown) that is at formed by coupling the first support member 902 with the second support member 1002 (shown in FIG. 10), according to one embodiment. In one embodiment, the height of the first distal end 908 of the first support member 902 is used for the height of the first distal end 214 of the first support member 124 of the electronic mobile device holder 104 (shown in FIG. 2). In one embodiment, the height of the first distal end 908 of the first support member 902 is used for the height of the first distal end 710 of the first support member 704 of the electronic mobile device holder 700 (shown in FIG. 7).

In one embodiment, the first support member 902 includes a sloped edge 914 that is concavely arcuate to increase a likelihood of securely mating with convexly curved back surfaces of some electronic mobile devices. According to various embodiments, the design of the concavely arcuate sloped edge 914 is applied to one or more other embodiments of first support members disclosed herein.

Figure 10:
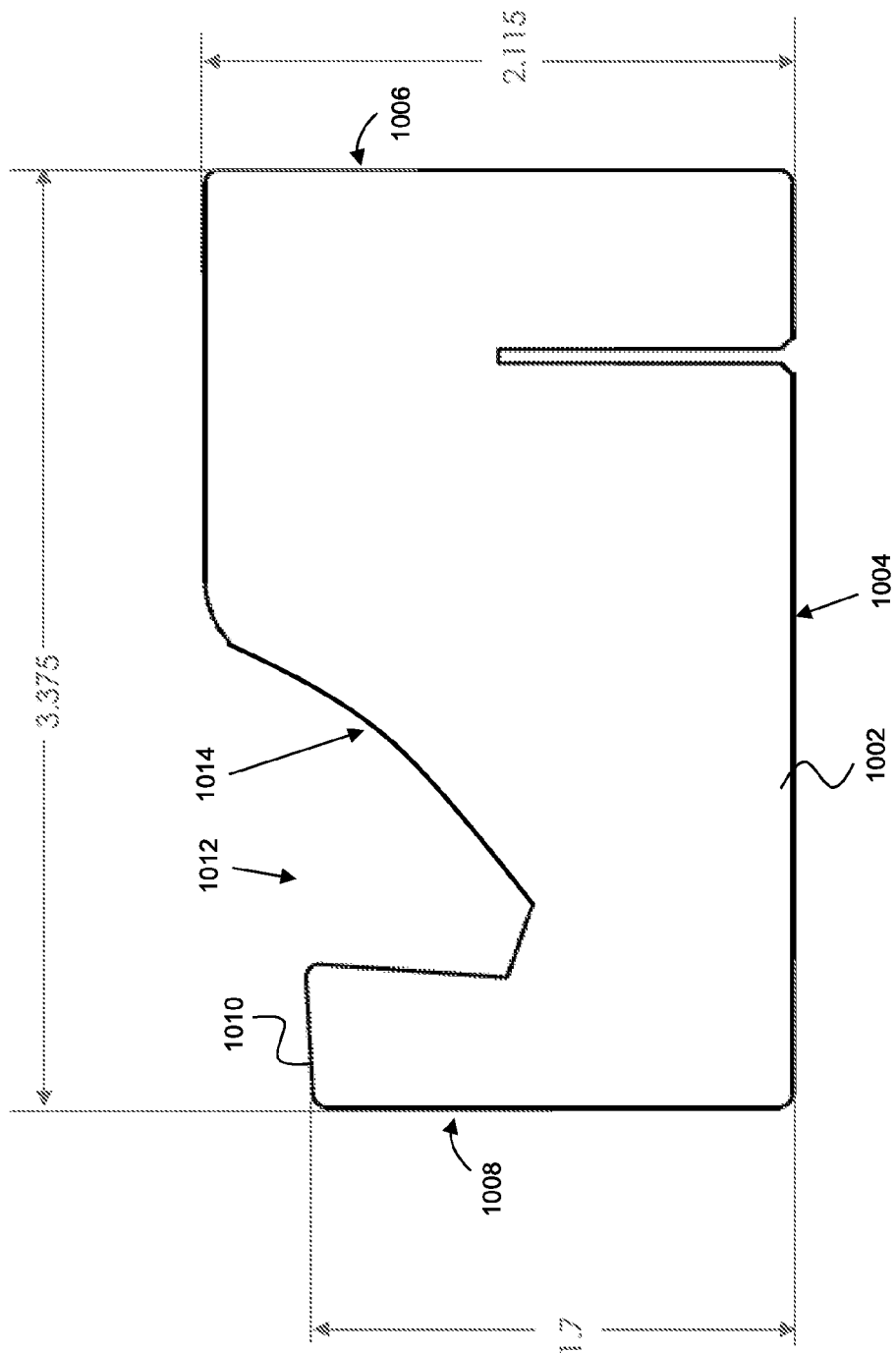
FIG. 10 is a diagram of a side view of part of an electronic mobile device holder, in accordance with one embodiment.

FIG. 10 illustrates a side view of a second support member 1002 with examples of dimensions of the second support member 1002, according to a specific illustrative embodiment of FIG. 10. The second support member 1002 includes a second bottom edge 1004 having a length of 3.375 inches or a length that is less than 3.4 inches, so that the second support member 1002 complies with or substantially complies with a length dimension of the ISO/IEC 7810 ID-1 standard, according to one embodiment. The second support member 1002 includes a second proximal end 1006 having a height of 2.115 inches or a height that is less than 2.2 inches, so that the second support member 1002 complies with or substantially complies with a height dimension or height limitation of the ISO/IEC 7810 ID-1 standard, according to one embodiment. The second support member 1002 includes a second distal end 1008 having a height of 1.7 inches or a height that is greater than 1.3 inches and less than 2.2 inches, so that a raised ridge 1010 at least partially forms a trench 1012 to support carrying a variety of sizes of electronic mobile devices, according to one embodiment. For example, with a second distal end 1008 having a height in the range of 1.5-1.8 inches, the second support member 1002 (joined with the first support member 902 of FIG. 9) can support a phablet, tablet or other electronic mobile device that is larger than a smart phone. The second support member 1002 includes one or more of the illustrated examples of dimensions for providing hands-free viewing and/or interaction with an electronic mobile device that is propped up or carried by an electronic mobile device holder (not shown) that is at formed by coupling the first support member 902 (shown in FIG. 9) with the second support member 1002, according to one embodiment. In one embodiment, the height of the second distal end 1008 of the second support member 1002 is used for the height of the second distal end 216 of the second support member 126 of the electronic mobile device holder 104 (shown in FIG. 2). In one embodiment, the height of the second distal end 1008 of the second support member 1002 is used for the height of the second distal end 714 of the second support member 706 of the electronic mobile device holder 700 (shown in FIG. 7).

In one embodiment, the second support member 1002 includes a sloped edge 1014 that is concavely arcuate to increase a likelihood of securely mating with convexly curved back surfaces of some electronic mobile devices. According to various embodiments, the design of the concavely arcuate sloped edge 1014 is applied to one or more other embodiments of second support members disclosed herein.

FIG. 11 illustrates a flow diagram of a process 1100 for manufacturing an electronic mobile device holder, according to one embodiment.

At operation 1102, the process 1100 begins, according to one embodiment. Operation 1102 proceeds to operation 1104, according to one embodiment.

At operation 1104, the process 1100 includes forming a first support member having a first slot, a first top sloped edge, and a first retention section, according to one embodiment. The first slot is formed in a first top edge of the first support member, according to one embodiment. The first top sloped edge slopes from an opening of the first slot in the first top edge towards a first bottom edge of the first support member in the direction of the first retention section, according to one embodiment. The first retention section includes a first trough and a first raised ridge, according to one embodiment. The first trough is defined as a concave formation in the first support member that is between (and includes) the first top sloped edge and the first raised ridge, according to one embodiment. Operation 1104 proceeds to operation 1106, according to one embodiment.

At operation 1106, the process 1100 includes forming a second support member having a second slot, a second top sloped edge, and a second retention section, wherein the second slot mateably couples to the first slot to couple the first support member to the second support member to form an electronic mobile device holder, according to one embodiment. The second slot is formed in a second top edge of the second support member, according to one embodiment. The second top sloped edge slopes from a second proximate end of the second support member to a second distal end of the second support member, according to one embodiment. The second trough is defined as a concave formation in the second support member that is between (and includes) the second top sloped edge and the second raised ridge, according to one embodiment.

The first slot in the first support member is configured to mateably slide into/over and couple with the second slot in the second support member to secure the first support member to the second support member in a substantially perpendicular configuration to form an electronic mobile device holder that carries and/or holds an electronic mobile device, according to one embodiment.

Operation 1106 proceeds to operation 1108, according to one embodiment.

At operation 1108, the process 1100 ends, according to one embodiment.

In accordance with an embodiment, an electronic mobile device holder, includes a first support member having a first substantially flat body, a first slot in the first substantially flat body, and a first top sloped edge of the first substantially flat body, according to one embodiment. The electronic mobile device holder includes a second support member having a second substantially flat body, a second slot in the second substantially flat body, and a second top sloped edge of the second substantially flat body, according to one embodiment. The first slot slides over the second support member and the second slot slides over the first support member to couple to the first support member to the second support member and to form an electronic mobile device holder, according to one embodiment. The first top sloped edge and the second top sloped edge are configured to carry an electronic mobile device while the first support member is coupled to the second support member, according to one embodiment.

In accordance with an embodiment, a system for orienting an electronic mobile device includes an electronic mobile device. The system includes a first support member having a first slot and a first top sloped edge, according to one embodiment. The system includes a second support member having a second slot and a second top sloped edge, according to one embodiment. The first slot slides over the second support member and the second slot slides over the first support member to couple to the first support member to the second support member and to form an electronic mobile device holder that carries the electronic mobile device, according to one embodiment. The first top sloped edge and the second top sloped edge are configured to carry a rear surface of the electronic mobile device to orient a screen of the electronic mobile device in a semi-upright orientation, according to one embodiment.

In accordance with an embodiment, an electronic mobile device includes a first support member having a first slot, a first top sloped edge, and a first means for retaining an electronic mobile device. The electronic mobile device includes a second support member having a second slot, a second top sloped edge, and a second means for retaining an electronic mobile device, according to one embodiment. The first slot couples with the second support member and the second slot couples with the second support member to couple to the first support member to the second support member to form an electronic mobile device holder that carries an electronic mobile device, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes are not significant, mandatory, or limiting, and the mechanisms that implement the invention or its features can have various different names, formats, or protocols. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the Figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. An electronic mobile device holder, comprising:
   a first support member having a first substantially flat body, a first slot in the first substantially flat body, and a first top sloped edge of the first substantially flat body; and
   a second support member having a second substantially flat body, a second slot in the second substantially flat body, and a second top sloped edge of the second substantially flat body,
   wherein the first slot slides over the second support member and the second slot slides over the first support member to couple to the first support member to the second support member and to form an electronic mobile device holder,
   wherein the first top sloped edge and the second top sloped edge are configured to carry an electronic mobile device while the first support member is coupled to the second support member;
   wherein the first support member includes a first proximal end adjacent to a first top flat edge that is adjacent to a first top sloped edge that is proximate to a first distal end,
   wherein the second support member includes a second proximal end adjacent to a second top flat edge that is adjacent to a second top sloped edge that is proximate to a second distal end,
   wherein the second support member includes a second bottom edge that is parallel to the second top flat edge,
   wherein the first slot is at least partially formed in the first top flat edge,
   wherein the second slot is at least partially formed in the second bottom edge.

2. The electronic mobile device holder of claim 1, wherein the first support member includes a first proximal end and a first distal end,
   wherein the second support member includes a second proximal end and a second distal end,
   wherein the first slot is proximate to the first proximate end and the second slot is proximate to the second proximate end.

3. The electronic mobile device holder of claim 1, wherein the first slot extends through approximately half of a height of the first support member,
   wherein the second slot extend through approximately half of a height of the second support member.

4. The electronic mobile device holder of claim 1, wherein the first support member includes a first retention section and the second support member includes a second retention section,
   wherein the first retention section and the second retention section prevent the electronic mobile device from sliding down the first top sloped edge and the second top sloped edge.

5. The electronic mobile device holder of claim 4, wherein the first retention section includes a first trough and a first raised ridge and the second retention section includes a second trough and second raised ridge.

6. The electronic mobile device holder of claim 5, wherein the first raised ridge is at least partially undercut by the first trough and the second raised ridge is at least partially undercut by the second trough.

7. The electronic mobile device holder of claim 5, wherein the first trough is concavely formed into the first body and the second trough is concavely formed into the second body.

8. The electronic mobile device holder of claim 5, wherein the first trough is polygonal and includes at least two corners,
   wherein the second trough is polygonal and includes at least two corners.

9. The electronic mobile device holder of claim 5, wherein the first trough is concavely arcuate and the second trough is concavely arcuate.

10. The electronic mobile device holder of claim 1, wherein the first support member and the second support member are formed using one of a group of formation techniques comprising:
    cut from a sheet of material;
    injection molded; and
    stamped from a sheet of material.

11. The electronic mobile device holder of claim 1, wherein the first support member and the second support member are formed from one or more of a group of materials comprising:
    aluminum;
    steel;
    vinyl;
    polyvinyl chloride;
    nylon;
    fiberglass;
    carbon fiber;
    fiberglass-aluminum mix; and
    carbon fiber-aluminum mix.

12. The electronic mobile device holder of claim 1, wherein a length of the first support member is approximately 3.750 inches and a height of the first support member is approximately 2.115 inches,
    wherein a length of the second support member is approximately 3.750 inches and a height of the second support member is approximately 2.115 inches.

13. The electronic mobile device holder of claim 1, wherein a length of the first support member, a height of the first support member, a length of the second support member, and a height of the second support member comply with dimension set forth by an ISO/IEC 7810 ID-1 standard for identification cards.

* * * * *